Figure 1:
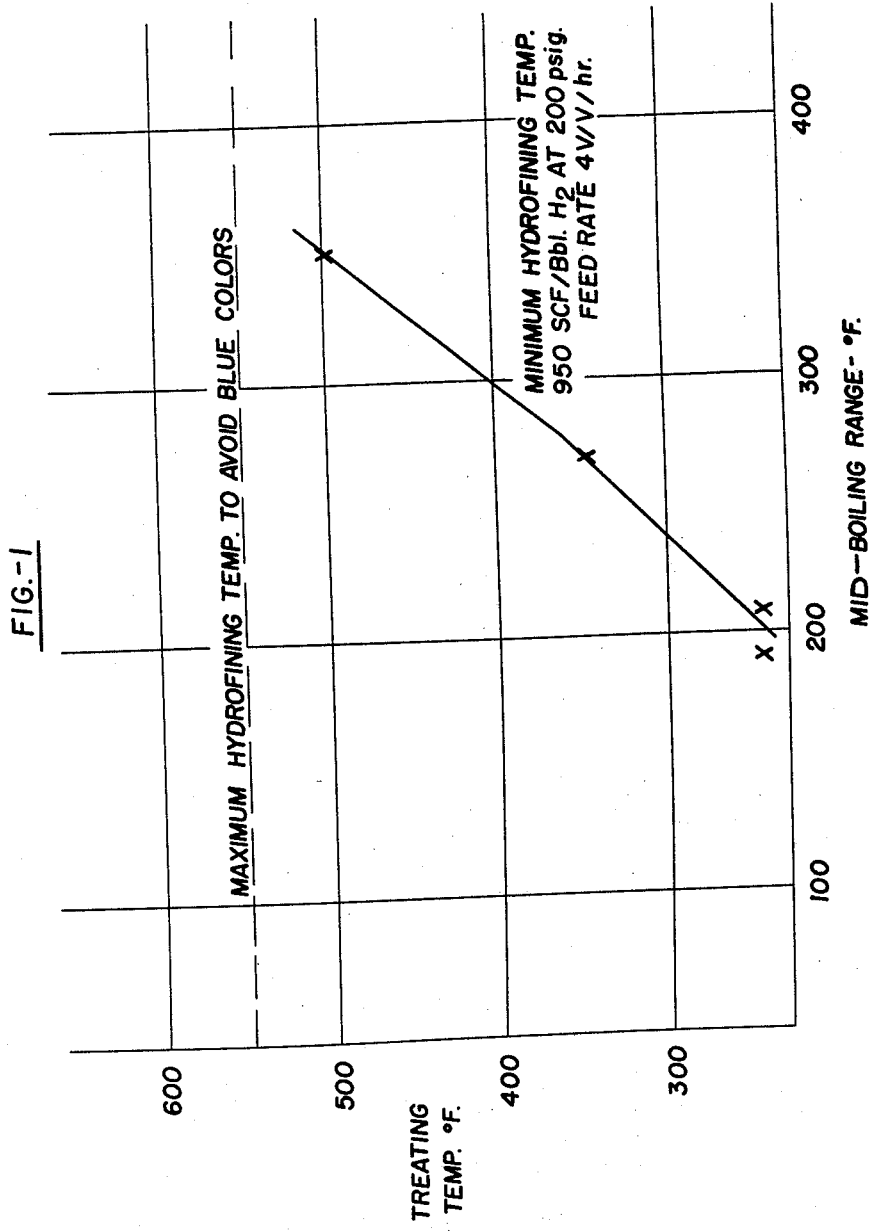

EFFECT OF H₂ RATE

Erwin Ward Nommensen  Inventor

EFFECT OF PRESSURE

EFFECT OF FEED RATE

Erwin Ward Nommensen  Inventor

United States Patent Office 2,916,445
Patented Dec. 8, 1959

2,916,445

HYDROTREATING HYDROCARBON SOLVENTS TO IMPROVE ODOR AND COLOR

Erwin Ward Nommensen, Baton Rouge, La., assignor to Esso Research and Engineering Company, a corporation of Delaware Application September 18, 1956, Serial No. 610,552

6 Claims. (Cl. 208—264)

The present invention relates to an improved process for the hydrotreating of hydrocarbon solvents. It has special application to narrow cut, highly refined petroleum or other hydrocarbon fractions such as paint and varnish thinners and solvents, dry cleaning agents and the like. It relates more particularly to improving the odor and color characteristics of such materials.

The prior art has previously suggested that various hydrocarbon fractions may be improved by treatment with hydrogen. In general, such treatment has been carried out at fairly high temperatures, usually above 600° F. Thus, the removal of sulfur compounds from naphthas and other fractions by treating with hydrogen in the presence of a hydrogenation catalyst at elevated temperatures is now well known. A recent patent of Jones et al., Patent No. 2,762,853, September 11, 1956, suggests that the odor characteristics of a particular type of hydrocarbon solvent fraction, obtained by sulfuric acid alkylation, may be improved by a very mild hydrogenation or hydrofining treatment at 300° to 700° F. Unfortunately, treatment designed for an alkylate probably containing sulfonation products is not necessarily suitable for other hydrocarbon fractions such as virgin fractions, even of the same boiling range. Frequently, also, treatment to remove odorous constituents results in color degradation, especially of virgin fractions.

According to the present invention, it has been discovered that various narrow cut fractions of the general boiling range between about 140° and 450° F. can be upgraded as to odor without color deterioration at lower temperatures than hitherto deemed practical. By adjusting the hydrogen rate and the feed rate of the fraction to be treated, it has been discovered that there is a definite temperature range, related to the boiling range of the fraction, that is suitable for the hydrotreatment. If the temperature is too low or too high, color degradation occurs even though odor may be improved. The minimum temperature, in general, must be not less than 50° F. and preferably not more than about 200° F. higher than the mid-boiling point of the fraction. This relates to narrow cut fractions, i.e., those having a boiling range spread not greater than about 100° F. The invention appears to be applicable as noted above, to all fractions within the general boiling range of 140 to 450° F.

It has also been found that when hydrocarbon fractions of this type are treated more drastically, i.e. at higher temperatures than about 550° F., and especially at higher pressures, and at lower feed rates, they become discolored with a blue cast. This is particularly true when the temperature of treatment is substantially above 550° F. On the other hand, under very mild hydrogenation conditions, a yellow discoloration has occurred which causes the products to be unacceptable against present standards. It is believed that the yellow discolorant is a polymer char material, possibly a polymerization product. At any rate, it is an objectionable constituent that can be avoided by properly selecting the operating variables according to the present invention.

From the above general statements, it will be appreciated that this invention has for its object the improvement of odor in narrow-cut hydrocarbon fractions of the solvent type with concomitant obtaining of good color characteristics. The invention will be more clearly understood with reference to the following detailed specification.

In the attached drawings, Fig. 1 shows graphically the relationship between the mid-boiling range of the fraction treated and the minimum hydrofining temperature to avoid production of a yellow color, other conditions such as feed rate, hydrogen rate and pressure being held constant.

Figure 2:
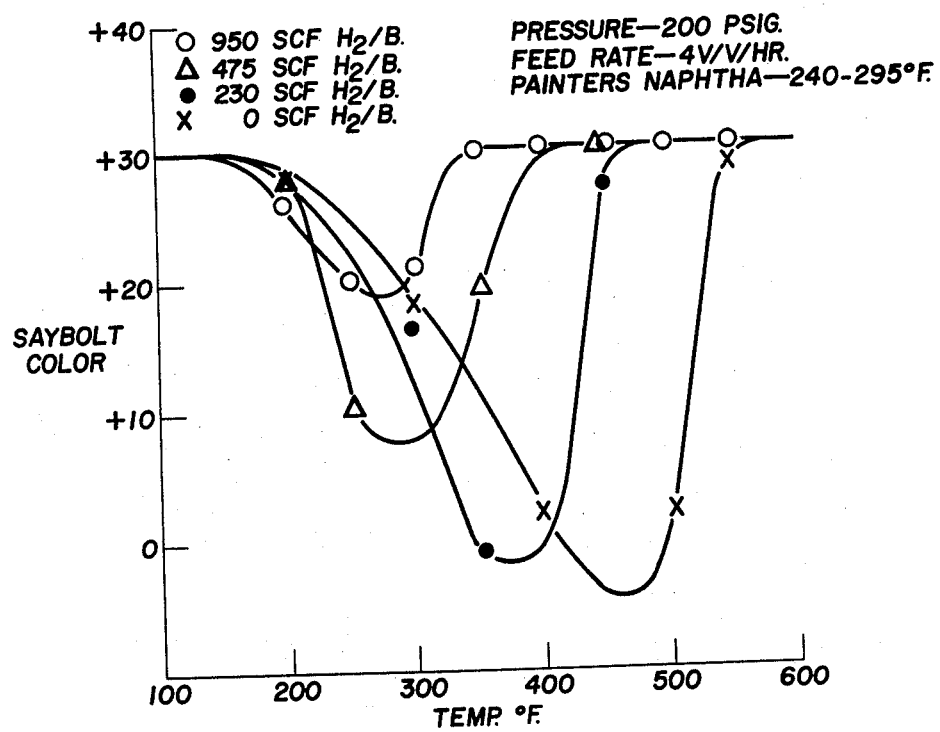
Figure 3:
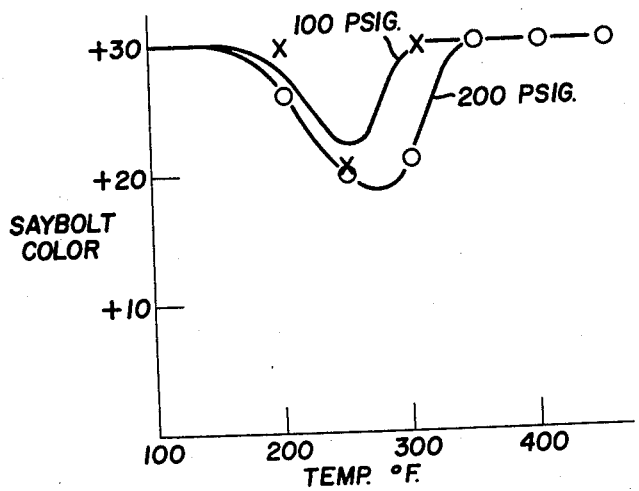
Figure 4:
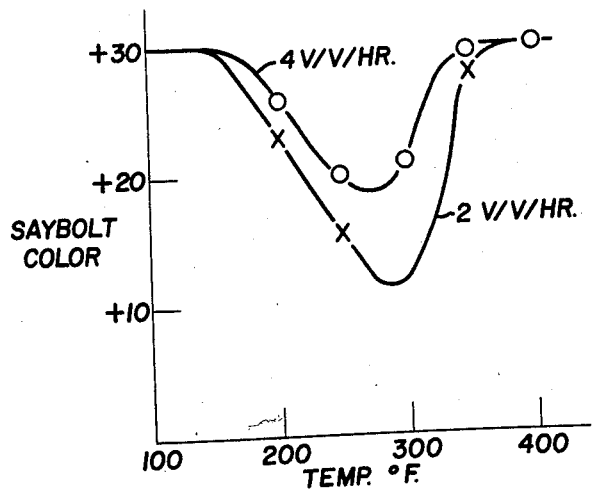

In Fig. 2, there is shown graphically, the relationship between temperature requirements and various hydrogen feed rates when treating a naphtha type solvent. Figures 3 and 4 show graphically the effects of variations in pressure and feed rate.

Several different narrow cut hydrocarbon fractions were tested by hydrofining under various conditions set forth in greater detail below. The fractions treated were respectively a rubber solvent with a boiling range nominally 140 to 240° F., a process solvent naphtha boiling from 200 to 240° F., a typical paint and varnish solvent, boiling between 240 and 295° F., a low flash solvent naphtha of boiling range 300 to 400° F., and a high flash naphtha of boiling range 325 to 400° F.

Each of these fractions was passed downwardly through a bed of hydrofining catalyst. The latter was a pelletized cobalt molybdate type catalyst, with about 3% by weight of cobalt oxide and 9% of molybdenum oxide on an alumina base substantially free of silica. Operating pressures were varied between 50 and 300 p.s.i.g. The hydrogen rate was varied between 0 and about 1000 s.c.f./bbl. Feed rate of the hydrocarbon fraction was varied between 2 and 4 v./v./hr. The temperature was varied generally between 200 and 550° F. At the latter temperature, most of the fractions tested began to acquire a blue color that was not deemed desirable. Many data were obtained in a larger number of runs of which the following are representative:

| Run No. | Feed | Hydrogen Rate | Temp., °F. | Pres., p.s.i.g. | Feed, v./v./hr. | Odor | Color | Percent S Removal |
|---|---|---|---|---|---|---|---|---|
| 67 | Rubber Solvent (140-240° F.) | 950 | 250 | 200 | 4 | Good | +30 | |
| 68 | do | 950 | 450 | 200 | 4 | do | +30 | |
| 69 | do | 950 | 550 | 200 | 4 | do | +30 | |
| 70 | do | 238 | 250 | 200 | 4 | | +29 | |
| 71 | do | 238 | 350 | 200 | 4 | | +30 | |
| 72 | do | 238 | 450 | 200 | 4 | | +30 | |
| 73 | do | 238 | 550 | 200 | 4 | Good | +30 | |
| 74 | do | 950 | 250 | 300 | 4 | do | +30 (Blue) | |
| 75 | do | 475 | 250 | 300 | 4 | | +30 | |
| 76 | do | 238 | 350 | 300 | 4 | | +30 | |
| 77 | do | 950 | 350 | 200 | 2 | Excellent | +30 | |
| 78 | do | 475 | 350 | 300 | 2 | | +30 | |
| 79 | do | 0 | 550 | 50 | 4 | | +30 (Blue) | |
| 80 | do | 950 | 550 | 50 | 4 | | +30 | |
| 81 | do | 950 | 550 | 200 | 4 | | Blue | |
| 28 | Solvent Naphtha (200°-240° F.) | 950 | 250 | 200 | 4 | | +30 | 88 |
| 29 | do | 950 | 300 | 200 | 4 | | +21 | 88 |
| 30 | do | 950 | 350 | 200 | 4 | Fair | +30 | 96 |
| 31 | do | 950 | 400 | 200 | 4 | | +30 | 96 |
| 32 | do | 950 | 450 | 200 | 4 | Good | +30 | 96 |
| 33 | do | 0 | 500 | 200 | 4 | | +30 | 71 |
| 35 | do | 950 | 550 | 200 | 4 | Fair | +30(Blue) | 96 |
| 39 | do | 475 | 550 | 200 | 4 | | +30(Blue) | 96 |
| 41 | do | 238 | 350 | 200 | 4 | | -1 | 80 |
| 42 | do | 475 | 400 | 100 | 4 | | +30 | 92 |
| 43 | do | 475 | 400 | 50 | 4 | | +30 | 92 |
| 44 | do | 950 | 350 | 200 | 2 | Fair | +28 | 96 |
| 87 | do | 0 | 300 | 200 | 4 | | +18 | 29 |
| 88 | do | 0 | 400 | 200 | 4 | | +2 | 0 |
| 90 | do | 238 | 300 | 200 | 4 | | +16 | 62 |
| 46 | Low Flash Solv. Naphtha (300-400° F.) | 950 | 250 | 200 | 4 | Fair | -9 | 20 |
| 47 | do | 950 | 300 | 200 | 4 | | 0 | 62 |
| 48 | do | 950 | 350 | 200 | 4 | | +3 | 81 |
| 49 | do | 950 | 400 | 200 | 4 | | +13 | 85 |
| 50 | do | 950 | 450 | 200 | 4 | | +18 | 92 |
| 51 | do | 950 | 475 | 200 | 4 | Fair | +25 | 98 |
| 52 | do | 950 | 500 | 200 | 4 | Good | +29 | 99 |
| 53 | do | 950 | 550 | 200 | 4 | do | +30 | 99 |
| 59 | do | 950 | 550 | 100 | 4 | | +25 | 100 |
| 63 | do | 950 | 250 | 50 | 4 | | +12 | 25 |
| 92 | do | 950 | 200 | 200 | 4 | | 10 | 0 |
| 97 | do | 475 | 425 | 200 | 4 | | +12 | 52 |
| 106 | High Flash Solv. Naphtha (325-400° F.) | 950 | 200 | 200 | 4 | | -5 | 3 |
| 107 | do | 950 | 250 | 200 | 4 | | +12 | |
| 108 | do | 950 | 300 | 200 | 4 | | +13 | 21 |
| 109 | do | 950 | 350 | 200 | 4 | | +12 | 24 |
| 110 | do | 950 | 400 | 200 | 4 | | +11 | 41 |
| 111 | do | 950 | 450 | 200 | 4 | | +12 | 55 |
| 112 | do | 950 | 500 | 200 | 4 | Poor | +27 | 86 |
| 113 | do | 950 | 550 | 200 | 4 | | +30 | 97 |
| 135 | do | 950 | 550 | 200 | 4 | Good | +30 | 97 |
| 119 | do | 475 | 350 | 200 | 4 | | +5 | 41 |
| 120 | do | 475 | 550 | 200 | 4 | | +30 | 97 |
| 121 | do | 950 | 550 | 100 | 4 | | +30 | 97 |
| | do | 950 | 550 | 50 | 4 | | +30 | 93 |

Referring now to Fig. 1, which represents operations at a constant and fairly high hydrogen rate and feed rate, it will be noted that with a very low boiling fraction such as the rubber solvent, which had a mid-point of 190° F., the minimum hydrofining temperature at which the objectionable odor components could be taken off, and the color maintained at the "water white" level, i.e., above +25 Saybolt, as measured by the Saybolt colorimeter, was about 250° F. The same was true of the narrow cut 200-240° F. fraction with its mid-point of 220° F. With the paint and varnish solvent naphtha, which had a boiling range of 240-295° F. and a mid-point of 268° F., the minimum hydrofining temperature was about 350° F. For fractions boiling at 350 to 400° F., the minimum was about 475-500° F.

Referring to Figure 2, the relationship between hydrogen rate and color is illustrated graphically by an interesting family of curves. With a high hydrogen rate, the minimum satisfactory hydrotreating temperature is lower than with a lower hydrogen rate. It is possible to obtain good odor and yellow color characteristics with no hydrogen, as shown in the curve at the right. However, the blue color mentioned above which occurred in all the fractions treated at about 550° F., or higher, becomes the limiting factor. This is represented by the upper line in Figure 1. The operating range is represented by the triangular area below the maximum line and to the left of the sloping minimum line. With the lower boiling fractions, there is considerable leeway for operation. With the higher boiling fractions, freedom of operation is much less.

Figure 3 shows that the effect of pressure is less significant. The minimum temperature required for water white color increases slightly with increased pressure. Evidently the increased pressure tends to promote formation of the yellow color bodies, believed to be polymeric or at least polynuclear in nature. As temperature is increased, these are apparently depolymerized or broken down.

Figure 4 shows the effect of feed rate. A slower feed rate, like an increase in pressure, probably promotes the formation of the color bodies at the lower temperatures. Higher temperatures destroy them. Here again, however, the effect of feed rate is less significant than the hydrogen rate.

An important advantage of the present invention is this discovery that high operating temperatures, i.e., above 550° F., are not necessary, and preferably are avoided, for these solvents.

Preferred operating conditions are as follows: Catalyst of the cobalt molybdate on alumina type is used. It contains approximately 3% by weight of cobalt oxide and 9% of molybdenum oxide on silica-free alumina. The catalyst preferably is not presulfided. Operation is effected at a pressure of from 50 to 500 p.s.i.g., preferably at about 275 p.s.i.g. Feed rate is from 1 to 5 v./v./hr., preferably at 4 v./v./hr. Hydrogen rates are 200 to 2000 s.c.f./bbl., preferably about 1000 s.c.f./bbl. of feed. Tail gas from a catalytic reforming plant is preferred as a hydrogen source for reasons of economy. Operating temperatures vary for different feeds, as indicated above, always below 600° F. and preferably below 550° F. and at least 50° F. and preferably not more than 200° F. above the mid-boiling point of the feed stock. For lower boiling fractions, i.e., those boiling below 240° F., preferred operating temperature is at 250° F. for the very low boiling to 400° F. for those of middle range. For higher boiling stocks, a temperature of 475 to 550° F. is preferred, i.e., about 125° F. above the mid-point of the feed. The broader range of 50° to 200° F. above the mid-point is generally satisfactory.

It is possible to set plant conditions so that any of the feeds mentioned above may be hydrofined without substantial change in any of the operating variables. These conditions are a hydrogen feed rate of 950 s.c.f./bbl., 4 v./v./hr., 200 p.s.i.g. and 500–550° F. These are the best conditions for the higher boiling solvents. They are somewhat less than optimum for lower boiling materials but are still quite satisfactory.

It will be noted that improvement in odor, while commonly attributed to sulfur removal, is not directly proportional to the latter. In some examples, odor was excellent with relatively low sulfur removal. In others, efficient sulfur removal did not entirely clear up bad odor. Likewise, unsaturation, as determined by bromine number, showed no clear relation to Saybolt color. The yellow coloring agent is believed to be composed of polynuclear aromatics but here again there is no clear relationship established between color and aromaticity.

The following conclusions, however, do appear to be well established by the data:

(1) Hydrofining under the conditions stated above produces marked improvements in hydrocarbon solvents boiling in the general range of 140 to 450° F.

(2) Sulfur in such solvents can be removed nearly 100% but improvement in odor is not due entirely to sulfur removal.

(3) Hydrogen rate, feed rate, pressure and temperature are interdependent in producing good sulfur removal, good color, and good odor in hydrocarbon solvents.

What is claimed is:

1. The process of producing narrow cut petroleum base solvents boiling within the general range of about 140 to 450° F., which solvents are free to a high degree of objectionable odor and color characteristics, which comprises treating a selected narrow cut fraction with 200 to 2000 s.c.f./bbl. of hydrogen in contact with a hydrofining catalyst, at a pressure of 50 to 500 p.s.i.g., a feed rate of 1 to 5 v./v./hr., and a temperature below about 550° F. and at least 50° F. and preferably not more than 200° F. higher than the mid-boiling point of said fraction.

2. Process according to claim 1 wherein the feed is a rubber solvent type hydrocarbon boiling between about 140 and 240° F.

3. Process according to claim 1 wherein the feed is a naphtha boiling between about 200 and 400° F.

4. The process of removing objectionable odor from a narrow cut hydrocarbon fraction boiling in the general range of about 140° to 450° F. without concomitantly causing color degradation thereof, which comprises passing the said hydrocarbon fraction over a cobalt molybdate on alumina catalyst at a feed rate of 2 to 4 v./v./hr. along with 200 to 1000 s.c.f. per barrel of hydrogen, at a pressure of 50 to 300 p.s.i.g. and at a temperature below about 550° F. and not less than 50° F. nor more than 200° F. above the mid-boiling point of said fraction.

5. Process according to claim 4 wherein the feed is a rubber solvent type hydrocarbon boiling between about 140° and 240° F.

6. Process according to claim 4 wherein the feed is a naphtha boiling between about 200° and 400° F.

References Cited in the file of this patent

UNITED STATES PATENTS

| | | |
|---|---|---|
| 2,761,817 | Sweetser et al. | Sept. 4, 1956 |
| 2,762,853 | Jones et al. | Sept. 11, 1956 |
| 2,769,760 | Annable et al. | Nov. 6, 1956 |
| 2,769,763 | Annable et al. | Nov. 6, 1956 |